Inventor
John H. Hidy
by
Mason, Kolehmainen, Rathburn and Wyss.
Attorneys.

July 3, 1962

J. H. HIDY 3,042,898

RECORDING AND REPRODUCING APPARATUS FOR
SEISMIC REFLECTION MAPPING

Filed June 28, 1956

Inventor
John H. Hidy
by
Mason, Kolehmainen, Rathburn and Wyss.
Attorneys.

July 3, 1962

J. H. HIDY 3,042,898

RECORDING AND REPRODUCING APPARATUS FOR
SEISMIC REFLECTION MAPPING

Filed June 28, 1956

Inventor
John H. Hidy
by
Mason, Kolehmainen, Rathburn and Wyss
Attorneys.

Inventor
John H. Hidy
by Mason, Kolehmainen, Rathburn and Wyss.
Attorneys.

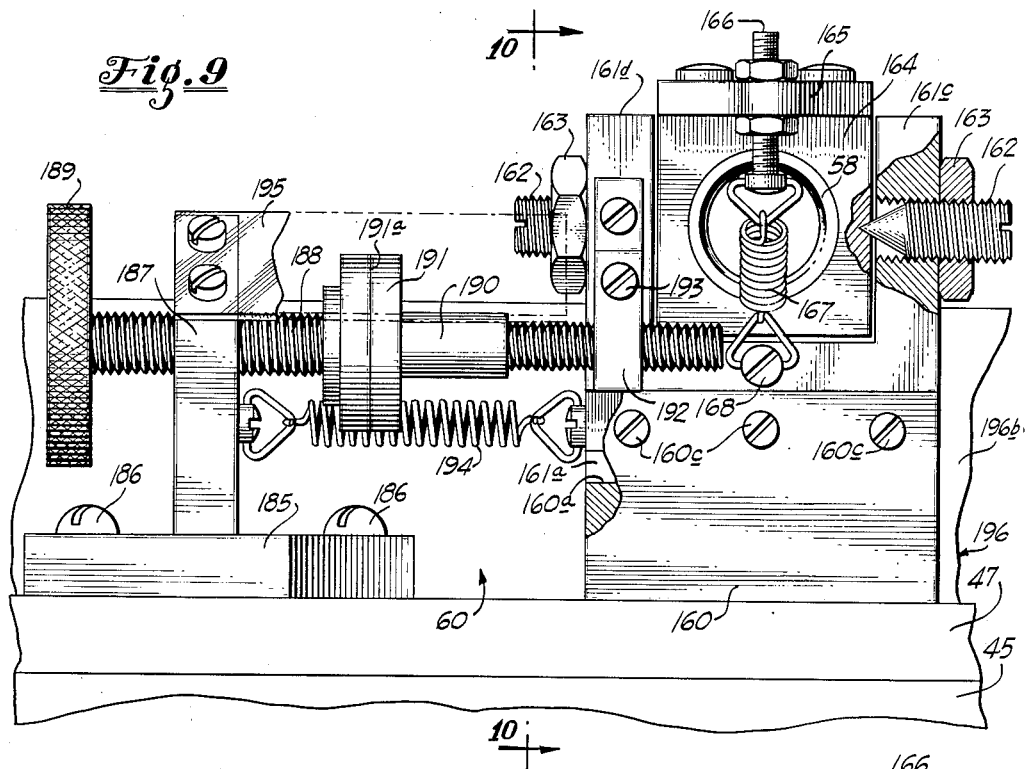
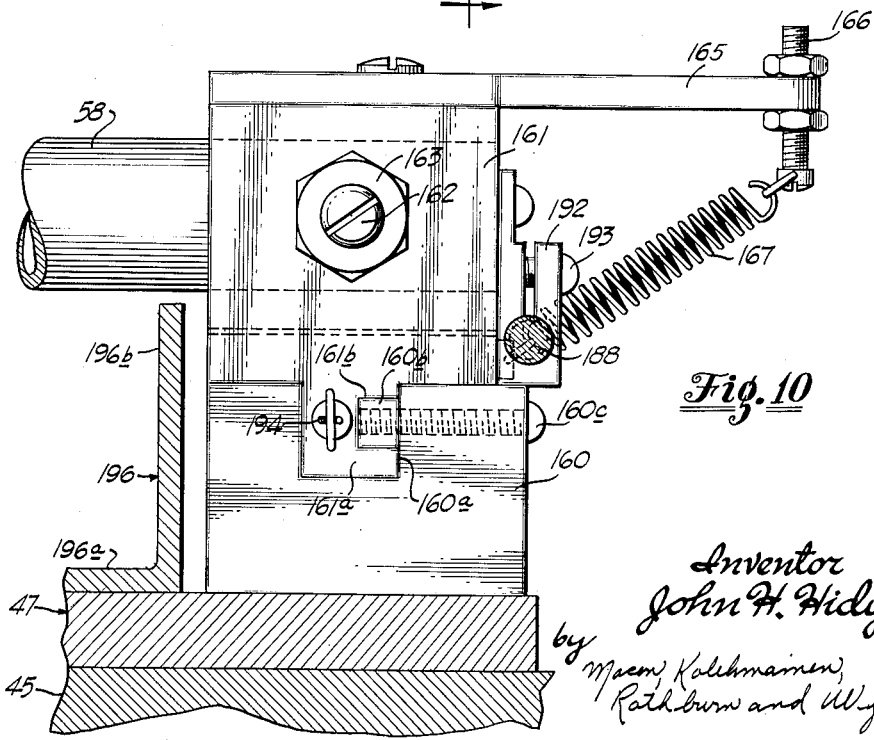

United States Patent Office 3,042,898
Patented July 3, 1962

3,042,898
RECORDING AND REPRODUCING APPARATUS
FOR SEISMIC REFLECTION MAPPING
John H. Hidy, Van Nuys, Calif., assignor to Seismograph
Service Corporation, Tulsa, Okla., a corporation of
Delaware
Filed June 28, 1956, Ser. No. 594,466
7 Claims. (Cl. 340—15.5)

This invention relates to geophysical prospecting and particularly to improved recording and playback apparatus used in seismic reflection mapping.

A commonly employed method of geophysical prospecting for subsurface geologic structures favorable to the accumulation of oil and/or gas is the seismic reflection method. In this method a hole is commonly drilled through the earth's low velocity layer, which may be as thin as 10 feet or as thick as 300 feet, but which is typically of the order of 50 feet thick. Vibration detectors, called geophones, are disposed usually in a linear array on one or both sides of the drilled hole, with the drilled hole usually lying in the line of the geophones, although it may at times be offset from the line of the array of geophones.

The geophones, which are usually electromechanical transducers, are connected by electric cable to a convenient central location, where the electrical signal corresponding to earth vibration received at each geophone is conducted through an amplifier, which commonly is provided with automatic gain control means and means for electrical filtering against frequencies outside the band of about 20–160 c.p.s. within which the seismic information of interest is contained. The output of each geophone-amplifier channel is fed to an element of a multitrace oscillograph recorder of the galvanometric type, recording as a function of time on moving photographic paper.

A small charge of explosive is fired under water tamping at some point in the drilled hole below the base of the low velocity layer where experiment has indicated best results are obtained, the act of firing the explosive generating a simultaneous electrical signal, which, applied to one of the traces of the recorder, indicates the instant of detonation of the explosive.

The detonation of the explosive generates elastic wave energy, principally in the form of dilatational wave motion, which spreads out in all directions in accordance with the physical laws governing the propagation of such energy. The first energy which arrives at a geophone displaced some distance from the shot point will be that which has traveled below and near the base of the low velocity zone, and has refracted through that zone to the geophone. Later arriving energy consists of a mixture of low frequency (5–15 c.p.s.), low velocity surface waves which may have been generated by the impact of the spherical wave front from the explosion at the surface of the earth overlying the explosion; energy derived from reflection at subterranean surfaces of contrast of acoustic impedance, ordinarily conformable with stratigraphic horizons; and other energy occupying approximately the same portion of the spectrum as the reflected energy.

A multiplicity of geophone-amplifier-recorder channels ranging from 12 to 24 is ordinarly used, with geophones spaced at an interval of 100 feet or less. Employment of a multiplicity of channels aids in the recognition of the arrival of reflected wave energy: since such energy arrives at all geophones at very nearly the same time since the extension of the geophone array is ordinarily small compared to the depth to the reflecting horizons; and since the waveform of the reflected energy from a given reflector is substantially identical at all geophone positions. The low frequency, low velocity surface wave energy mentioned above is easily recognizable on the recordings, and interference from this source is easily eliminated by employment of suitable electrical filtering.

From the interval of time elapsed between the detonation of the explosive and the arrival of the successive reflected events, and the determinable velocity of propagation of seismic waves as a function of depth, the depth to the various reflectors may be computed and cross-sections and/or contour maps may be made showing the presence of subsurface geologic situations favorable to the accumulation of oil and/or gas.

Instrumentation and procedure essentially equivalent to that outlined in the paragraphs above sufficed to yield useful seismic reflection recordings in the areas of first application of the seismic reflection method, namely, in the Seminole Plateau area of Oklahoma, the Central Kansas uplift, and many portions of the Gulf Coast of Texas and Louisiana. Efforts to extend the application of the method into other areas, however, were less succesful, since it was frequently not possible to record clearly the arrival of reflected events, due to the pressure of other energy occupying substantially the same portion of the spectrum, but apparently random in character from geophone position to geophone position.

In an effort to improve the recognizability of reflected events in the presence of the interfering energy, the separation between geophones was sometimes decreased, the pass band of filtering was decreased to the extent possible without deterioration of the recording of reflected energy, and multiple selection of the choice of filter high and low frequency cutoffs was made available.

Further effort at improvement was made by the employment of several geophones per amplification and recording channel, as a means for gaining a statistical improvement of signal-noise ratio, in the expectation that signal would add algebraically, as long as the spacing between the first and last geophones of a group was not excessive, and that noise would add statistically, i.e., in proportion to the square root of the number of geophones per group, as long as the spacing of geophones was sufficient. Two, three, six, and as many as twelve geophones per recording channel have been employed. Improvement has generally been observable, although the amount of improvement has not been nearly so great as would be expected on the basis of the assumption of noise independent in phase and amplitude at each geophone within a group. The improvement at some shot points has been spectacular, at others negligible.

As a means of accomplishing somewhat the same result as the employment of a multiplicity of geophones per recording channel, methods of sharing the energy between a channel and adjacent channels, such that, for example, one-half the energy of a given channel appears in adjacent channels, one-fourth in the next adjacent channels, etc., have been employed. This procedure has the effect of simplifying the process of moving from one trace to another on what is thought to be a reflection pick, but is open to serious criticism as to whether many of the picks as followed through are actually continuous reflections.

Despite the above-described efforts of those skilled in the art of seismic reflection prospecting, many important petro-liferous areas remain in which, although suitable reflectors are available in the subsurface, the ratio of reflected energy to other energy (the signal-noise ratio) is so unfavorable as to make reflection seismic mapping impossible, or, at best, extremely unreliable, necessitating dependence on other geophysical methods of low resolving power. Southwestern Kansas, The Oklahoma and Texas Panhandles, much of the Anadarko Basin of Western Oklahoma, the Edwards Plateau of West Texas, and Southeastern New Mexico, are a few of the many areas in which this situation prevails.

Now it appears that the source of the interfering energy observed on seismic reflection recordings lies in the existence within and near the low velocity zone of localized variations in acoustic impedance which serve as centers from which both the primary elastic wave energy spreading out in all directions from the shot and other energy derived from this can be scattered in all directions. Among the causes for such localized variations in acoustic impedance are topography on both the top and bottom surfaces of the low velocity zone; buried drainage patterns; differences in the weathering of rocks, particularly of anhydrite, as found in the area of outcrop and shallow burial of the Blaine gypsum formation in Western Oklahoma; recent volcanic necks and lava flows, as found, for example, in the Marfa Basin of Southwest Texas; fissuring and jointing, as in the massive limestone found at or near the surface in the Edwards Plateau of West Texas; and the existence of discontinuous masses of caliche (sometimes called "desert limestone") in West Texas.

The intensity of the scattered wave energy in the vicinity of the geophone array depends on the number, distribution, and effectiveness of the sources of scattering at distances up to a mile or more (round-trip travel times up to 2 seconds or more) from the shot point. In relation to the energy of reflections the scattered energy, geometrically attenuating substantially as a two-dimensional propagation following an inverse first power law, gains over the reflected energy which geometrically attenuates as a three-dimensional propogation following an inverse square law.

With a multiplicity of scattering centers randomly located with respect to the geophone array, the resultant noise energy is highly random in both time and space, as a result of reinforcement and cancellation of wave motion arriving from all directions. This explains the erratic improvement in signal-noise ratio observed when multiple geophones are employed. If the majority of the scattering centers are located substantially in line with the geophone array, a spectacular improvement in signal-noise ratio is observed as compared to employment of a single geophone per recording channel. If the majority of the scatterers are substantially offside to the array, the improvement is negligible.

The object of the present invention is to provide a new and improved recording and reproducing apparatus for use in seismic reflection geophysical mapping by means of which seismic recordings can be obtained in which the ratio of signal (reflected wave energy) to noise (scattered random wave energy) is substantially improved, permitting the conduct of successful reflection seismic surveys in areas of high level of random wave energy.

The apparatus of the present invention is particularly useful in the practice of the invention described and claimed in copending application Serial No. 281,105, now Patent No. 2,795,287 filed April 8, 1952, by Joseph A. Sharpe and assigned to the same assignee as the present invention. The method therein described embraces the production of an adequate number of individual seismic recordings for each of which the waveform and time relationship of the reflected events is substantially unchanged; except possibly for constant, known time differentials such as are the result of variations in the thickness of the low velocity zone or the depth of shooting, and except possibly for monotonically decreasing small known time differential functions of reflection arrival time which are the result of variations in relative location of shot-point and geophone array; but for each of which recordings the amplitude and phase of the noise energy at corresponding geophone positions is substantially random; and, finally, algebraic superpositioning of the various recordings at corresponding geophone positions, with due allowance for any constant and variable time differentials, yielding a new recording with signal added algebraically and noise added statistically.

The seismic recordings with reflection waveform substantially invariable and noise energy at corresponding geophone positions substantially random from recording to recording are made by changing the depth at which the explosive is detonated (effective for scatterers lying very near the shot point); changing from one geophone array to another with explosions detonated in the same drill hole; and changing from one drill hole to another, with the location of the geophone array remaining fixed; or combinations of all three or of any two of these.

The seismic recordings can be of conventional galvanometric type, with the algebraic addition of the corresponding traces carried out by measuring and tabulating the ordinates for each corresponding trace for each millisecond following the instant of explosion; if necessary applying a constant relative time correction for depth of shooting and/or low velocity zone transmission time difference; if necessary applying a monotonically decreasing relative time correction appropriate to difference in distance from shot-hole to geophone; summing the results for corresponding traces; and plotting the sum for each trace as a function of time.

However, the labor involved in the above-outlined method is tremendous, and the object of the apparatus of this invention is to provide means to accomplish this method rapidly, automatically, and with flexibility in the insertion of any constant and variable time corrections required, the latter of which are a function of the velocity-depth relationship, which is not always accurately known.

In the apparatus of this invention the original individual seismic recordings are of phonographically reproducible type and may be made in accordance with any of the techniques well known in the art of sound recording but are preferably magnetic. The summation of corresponding traces is accomplished by successively or simultaneously scanning the recordings of corresponding traces by scanning means appropriate to the recording medium, with introduction of any constant relative time difference required by means providing relative offset of the scanning head and recording medium, and with introduction of any small variable relative time difference required by means slowly changing the relative offset of the scanning head and recording medium in accordance with the velocity-depth relationship applicable; and with summation and recording of the corresponding traces effected by appropriate means.

One of the features of the recording apparatus of the present invention is that a number of records each having a plurality of traces thereon may be produced during the recording operation and the records may be inserted into and removed from the apparatus with ease. Similarly, a large number of records and their traces may be scanned simultaneously during playback and these records are also capable of ready insertion into or removal from the reproducing apparatus. The provision of apparatus wherein records may be so manipulated thus constitutes an important object of the present invention.

Another object of the present invention is to provide playback apparatus in which the composited signals resulting from addition of signals reproduced from corresponding traces on the several records are recorded on a composite record which is driven from the drive means for the several records being reproduced.

In producing the seismic recordings referred to above, the equipment must frequently be transported from place to place, often over rough terrain, with the result that the magentic recording or reproducing heads are subject to damage resulting from vibration and shock. An important object of the present invention is to provide means for firmly holding these heads out of engagement with other parts of the apparatus in order to minimize such damage.

The new apparatus is disclosed hereinafter by the use of specific examples schematically illustrated by the accompanying drawings in which.

FIG. 9 is an enlarged fragmentary, front elevational view showing the mounting for each of the transducer heads used in the apparatus of the present invention and also illustrating the adjusting mechanism for altering the position of the head with respect to its associated record trace; and FIG. 10 is a fragmentary sectional view taken along a line substantially corresponding to line 10—10 in FIG. 9.

Figure 1:
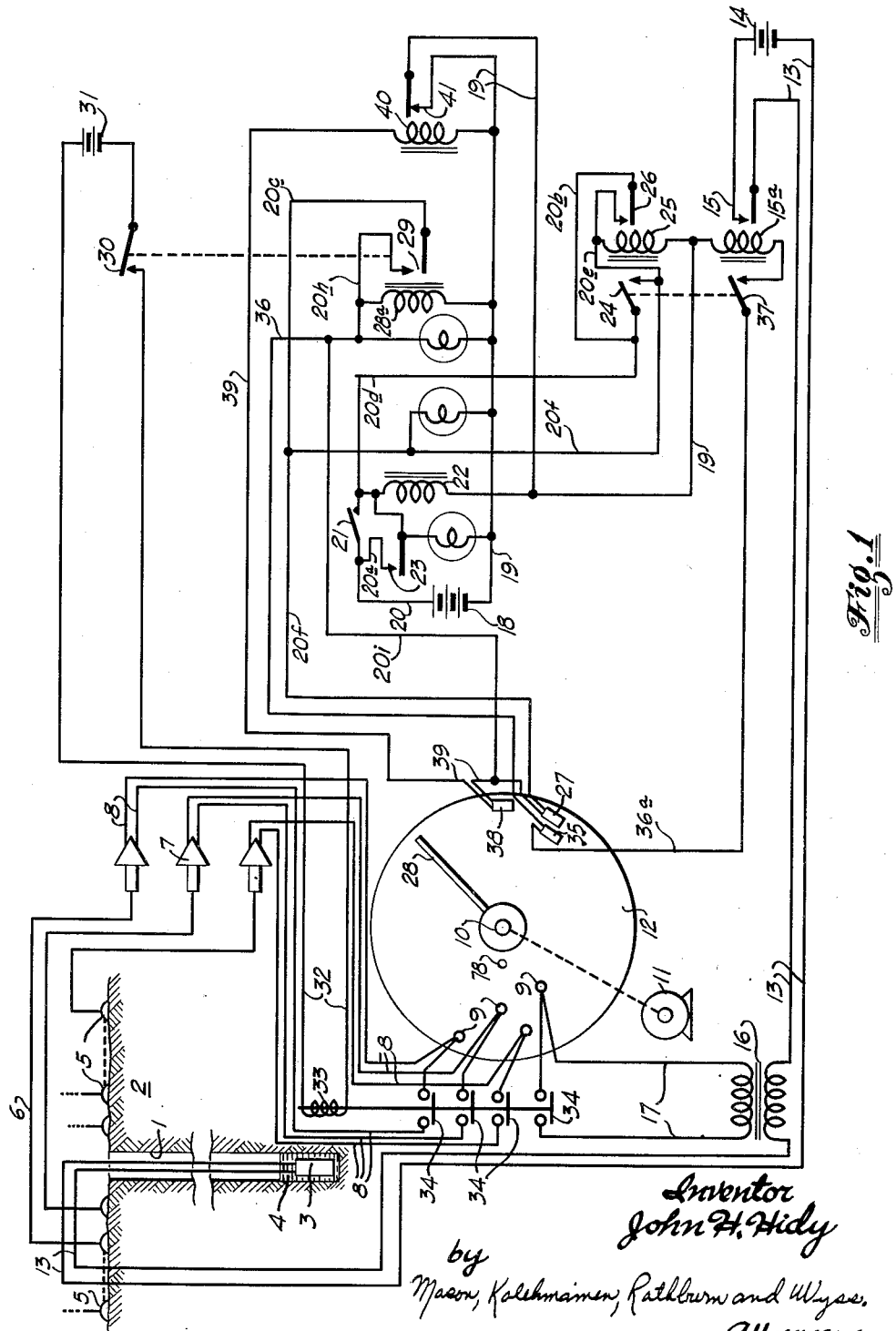
FIG. 1 shows in vertical section a portion of the earth in which a shot-hole is bored with a geophone array on the earth's surface, and schematically illustrates circuits required for operation and for the recording, the record being a disc shown as a plan view.

Referring first to FIG. 1, a shot-hole 1 is bored in the earth 2 with the explosive charge 3 in the bottom of the hole 1 and tamped by a suitable material such as water 4. Geophones 5 are arrayed on the earth's surface on either side of the mouth of the bore hole 1, it being understood that although in this figure only a relativly few of the geophones are shown, any of the previously described arrays may be used. Each geophone is connected by a multi-conductor cable 6 with its amplifier 7, the output of which is connected by a multi-conductor line 8 to a magnetic recording head 9 which may be of the type used for magnetic tape recording and the like. There is one of these heads for each geophone. A rotary spindle or drive means 10 is connected by a suitable drive with a motor 11, precautions being taken to the end that the drive means 10 is rotated at as constant a rotary speed as is possible. A magnetic recording disc 12 is mounted on the drive means 10 so as to be rotated thereby. This disc may be a glass disc having a coating of magnetically retentive material. The various recording heads 9 are disposed around the spindle in such a fashion that each may make a circular trace which does not overlap the trace of any other head. Only a few of these heads are shown, so as to avoid confusion in the drawing.

The explosive charge 3 is connected by a multi-conductor cable 13 with the detonating potential, such as a battery 14, under the control of relay contacts 15. The primary of a transformer 16 is connected in circuit with the lines of the cable 13 and the output of the secondary of this transformer is fed through lines 17 to one of the recording heads 9.

When the relay contacts 15 close the battery 14 applies detonating voltage to the charge 3 so that a shot impulse is applied to the earth. At the same time, through the transformer 16 the one of the recording heads 9 connected to the secondary of this transformer records the shot instant on the disc 12 as one of the traces. Any vibrations picked up by the geophones 5 are also recorded as separate traces on the disc 12. A timing signal may also be placed on the one of the recording heads 9 used for the shot instant by introducing across lines 17 a small fraction of the alternating voltage of carefully controlled constant frequency used to drive motor 11.

A control circuit is required to assure that the recording heads 9 are activated prior to the shot instant, and to assure that they are deactivated prior to any recording head starting a retrace over the one it has just made. This is the function of the control circuit shown in FIG. 1 and described below.

In this control circuit a battery 18 has one pole (illustrated as the negative pole) connected to a line 19 and its other pole connected through a line 20 to a normally-open manually controlled switch 21 which, when momentarily closed, connects control coil or solenoid 22 of a relay across the battery. Specifically, actuation of the switch 21 connects one side of relay coil 22 to the positive terminal of the battery 18 while the other side of this coil is connected to the negative side of the battery through line 19 and through normally-closed contacts 41 of a relay to be described more fully hereinafter. Energization of the control coil 22 closes contacts 23 associated therewith in order to connect the control coil through branch line 20a to the positive terminal of battery 18, thereby to seal the coil across the battery even after the switch 21 is released. The line 20 is connected through conductor 20d to a normally-open manually operated switch 24, which, when momentarily closed, energizes control coil or solenoid 25 of a relay by way of conductor 20e. Energization of the control coil 25 closes contacts 26 associated therewith and, as a result, the control coil is sealed across the lines 19 and 20 through a branch circuit including conductor 20b and the contacts 26 even after the switch 24 is released.

After the switches 21 and 24 have been actuated, the positive terminal of the battery 18 is connected through conductor 20f to a normally-open limit switch 27 positioned adjacent to the spindle 10. The switch 27 is adapted to be engaged by an arm 28 carried by the spindle 10 and rotatable with the disc 12 for the purpose of momentarily closing the contacts of the limit switch as the arm is brought into engagement therewith.

The limit switch 27 functions as a starter switch by virtue of the fact that when closed this switch connects the positive terminal of the battery 18 through conductor 20i to one end of a solenoid or control coil 28a of a relay. Since the other end of the control coil 28a is connected directly to line 19, actuation of the limit switch 27 energizes control coil 28a in order to close normally-open contacts 29 with the result that branch line 20c connected to conductor 20f and branch line 20h cooperate to seal the control coil 28a across the battery 18 even after the arm 28 is moved out of engagement with the starter switch 27. Energization of the solenoid 28a also closes normally-open contacts 30 through which a battery 31 is connected by lines 32 to the solenoid 33 of a relay having normally-open contacts 34 interposed in each of the lines 8 connecting the outputs of the amplifiers 7 with the head 9. One set of these contacts 34 is also interposed in the lines 17 connecting with the shot point instant recording head 9. It follows that when the arm 28 actuates the starting switch 27 so that the solenoid 28a is energized, all of the recording heads 9 are simultaneously actuated. It will be understood that prior to the actuation of the limit switch 27 all of the recording heads 9 are disconnected from their respective signal sources.

A second micro limit switch 35 is positioned for actuation by the arm 28 a short time after the actuation of the starting switch 27. The micro limit switch 35 functions as a shooting switch and is of the normally-open type which, through its contacts, connects a line 36a to conductor 36. The latter conductor is connected to the positive side of the pattery 18 after the above-described operation of the starting switch 27 has occurred. As a consequence, energization of the limit switch 35 connects the positive terminal of the battery 18 through conductor 36a and through the contacts 37 of a normally-open manually controlled switch, to one end of a solenoid or control coil 15a having its other end connected directly to the conductor 19. Actuation of the solenoid 15a closes contacts 15 associated therewith and causes the battery 14 to detonate the charge 3 through the lines 13. It should be observed that both of the switches 24 and 37 must be manually closed in order to effect the detonation of the charge, and preferably these two switches are interconnected for simultaneous actuation. It should also be observed that the line 36a cannot receive power from the line 20 unless the starting switch 27 has first connected the conductors 36 and 20i to the positive terminal of the battery 18 in the manner described above.

The diameter of the disc 12 and its rotating speed must be such that all of the useful reflections are recorded prior to the instant when the heads 9 begin to retrace. Recording is, of course, proceeding during the present phase of this description.

As the arm 28 is brought into proximity with the starting switch 27, this arm first encounters and actuates a third normally-open limit switch 38 which is interposed in a line 39 connecting the conductor 20i to one end of a solenoid or control coil 40 of a relay switch, the other end of this solenoid connecting with the line 19. The latter relay includes normally-closed contacts 41 inserted in the line 19 through which the circuits are established for energizing the solenoids 22 and 25 in the manner previously described. Momentary opening of the contact 41 by the actuation of the switch 38, which functions as a stop switch, momentarily deactivates the solenoids 22 and 25 so that their respective sealing contacts 23 and 26 open and unseal the holding or sealing circuits for the solenoids. This also deenergizes the solenoid 28a so that both its sealing contacts 29 and its contact 30 are opened to de-energize the coil 33, thus permitting all of the contacts 34 to open and disconnect the heads 9 in order to prevent these heads from re-recording on the same traces of the disc 12.

In making the records shots are fired from horizontally displaced shot points or holes and the geophones 5 are arranged in linear arrays mutually parallel and each aligned with one of the shot holes. As described in the above identified Sharpe application, the shot holes may be displaced from each other longitudinally respecting the arrays, as well as laterally. Various distances of displacements may be used, the lateral and longitudinal displacement used being possibly from 50 to 150 feet. Bore holes, of course, are drilled at each of the shot points.

The making of one record has already been described and if this record was made by shooting in a first bore hole with the signals obtained with the geophones aligned with this shot point, a second record is then made to obtain the signals from the same geophones but with the shot point shifted to a second hole spaced from the first. Next, the geophone array aligned with the second hole is used to obtain two more records obtained respectively by shooting successively in the second and first holes. If desired, more records may be made by shooting in the same holes but at different depths. The result is a group of records.

The desired event reflected from a subsurface interface arrives at all of the geophones at substantially the same time, regardless of the geophone array and irrespective of which of the bore holes is being used for the shot while the wave front traces reflected from an undesired scatterer located at some distance from the bore holes arrive at different times respecting each of the geophones. After obtaining the described group of records, corresponding signal traces thereon are summed or composited.

Figure 2:
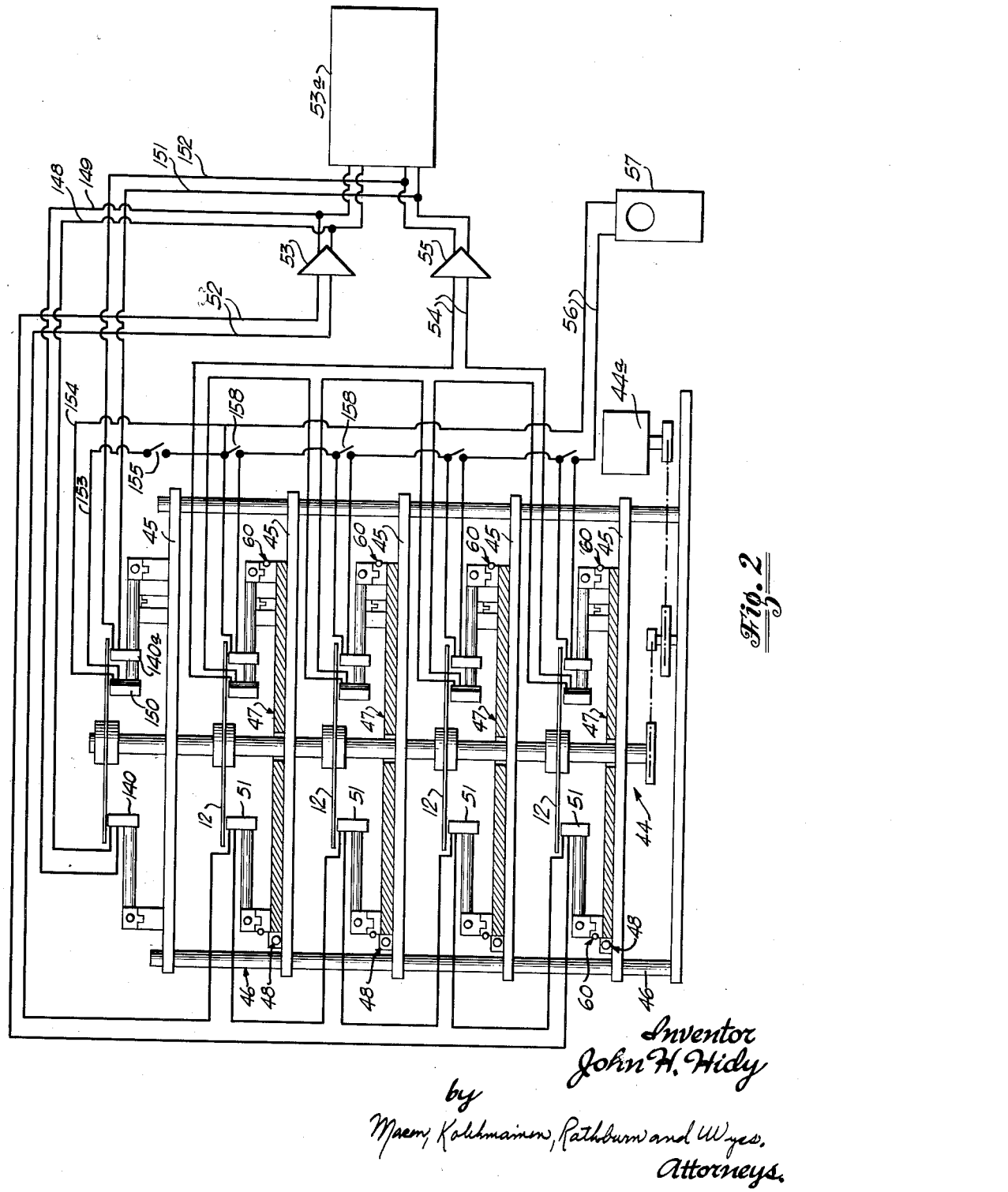
FIG. 2 is an elevation view showing schematically the summation or compositing equipment and the arrangement for recording the end result, including the circuit required.

The compositing apparatus shown by FIG. 2 comprises a vertical spindle or drive means 44 which is rotated through an appropriate gear train or the like by a motor 44a. The arrangement is such that this spindle turns as exactly as possible at the speed with which the spindle 10 was turned during the recording. The spindle 44 passes rotatively through a series of decks 45 which are non-rotatively supported by a frame 46. The various magnetic recordings obtained as described are mounted individually on the spindle 44 so that one of the records is above each of the decks 45. These decks each mount a rotative carrier 47 which may be rotated by an adjusting means 48 and which is provided with an azimuth indicator 49 in the form of a conventional micrometer scale. Each rotative carrier 47 mounts a plurality of transducer or reproducing heads 51 of which there should be one for each of the previously described traces and each of these heads is adapted to engage the underside of its associated record for playback. As to each deck all of the reproducing heads should be oriented relative to each other as exactly as possible, as were the corresponding recording heads 9 used during the recordings. These reproducing heads may be of the magnetically actuated type used in conjunction with playing back magnetic recordings.

It will be remembered that during the recording each geophone is connected with its individual recording head. Therefore, with the reproducing heads 51 geometrically oriented as were the recording heads throughout all of the decks, the respective outputs from all of the pickups positioned and oriented throughout the various decks so as to correspond with any given one of the recording heads now are available for compositing.

As shown by FIG. 2, the corresponding reproducing heads for any one geophone phonographic representation are interconnected by lines 52 which are fed to the input of a suitable amplifier 53 and from its output to one of the inputs of an oscillographic recorder 53a of the type usually used to record from the geophones. What might be called the next set of pickups or reproducing heads are then interconnected by the lines 54, fed through a suitable amplifier 55 and from there into another of the inputs of the oscillograph. This is done throughout all of the traces excepting for the trace of the shot point instant. The various pickups of the recording apparatus which are associated with the shot point instant traces are all interconnected by lines 56 to the input of a cathode ray oscilloscope 57. Preferably each of the shot point instant pickups is provided with a shorting switch 158 so that these pickups may be connected selectively to the oscilloscope 57.

With the records 12 rotating and the shot point instant pickups active, the purpose of the oscilloscope 57 is to permit adjustments in azimuth of each individual record by the adjusting means 48 in order to make their respective shot instants coincide as a function of time. With any two of the pickups connected with the input of the oscilloscope 57 and with the other pickups shorted out, it is possible to alter the adjusting means 48 of the carriers on the decks associated with these pickups until the shot point instants seen as the screen of the oscilloscope 57 are brought into coincidence. Then using one of these orientations as a standard and by appropriate use of the switches 158 one after another of the balance of the decks may be adjusted in azimuth until all of the shot point instants coincide. In case the shot points were at different depths, appropriate compensation for this may be made by calculated azimuth displacements by using the indicator 49.

At the time the shot point instants are aligned it is convenient also to check that each of the original recordings was taken at identical speeds of the recording disc by noticing on the oscilloscope whether one timing signal is "crawling through" the other; and to check that the compositing speed is the same as the recording speed within required tolerances by comparing one of the timing trace signals with the accurately controlled constant alternating voltage applied to the motor 11, by means of a Lissajous figure on the face of the oscilloscope.

With the foregoing adjustments made the discs are simultaneously played back so as to obtain a record from the oscillograph with each curve on the record representative of one geophone or of one common multiplicity of geophones but with the recorded result representing a composite of the four shootings. Since, as previously explained, the desired event arrived in each instance at substantially the same time, whereas the undesired scatterings or noise arrived at random times, it follows that as to each curve the desired event is reinforced, whereas the undesired scatterings or noise are relatively diminished on the final record through mutual cancellation occurring to a greater or lesser degree respecting all of the undesired scattered energy.

As previously indicated, the motor 11 is an alternating current motor of the type that rotates at a constant speed if supplied with alternating current of constant frequency. There are known ways to provide a source of such current and therefore an illustration of the same is considered unnecessary. The manner of feeding a small fraction of this current to one of the recording heads, to provide a time trace, is considered adequately clear to eliminate the need for its illustration also.

FIG. 2 shows that each reproducing head 51 is mounted on its deck 45 by an arm 58 extending to the deck's peripheral portion where it is mounted upon a support means constructed to permit an azimuth adjustment and having an azimuth adjusting means 60. Each of these adjusting means may be manipulated to adjust each of the heads individually in azimuth in order to introduce any small variable trace-to-trace time differences required and as previously mentioned.

The above also makes provision for any fixed but nonidentical weathering corrections by providing for adjustments of the individual heads as required. Also, the support means for the reproducing heads are capable of being locked when once adjusted.

Figure 3:
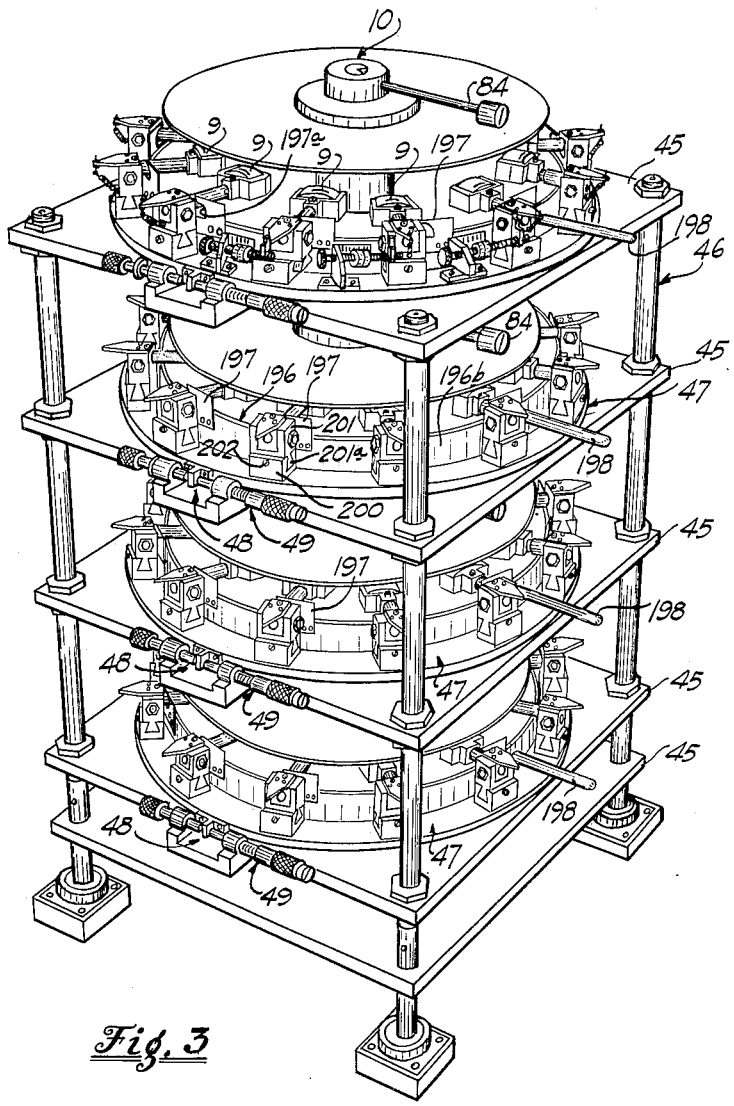
FIG. 3 is a perspective view showing recording apparatus characterized by the features of the present invention.
Figure 4:
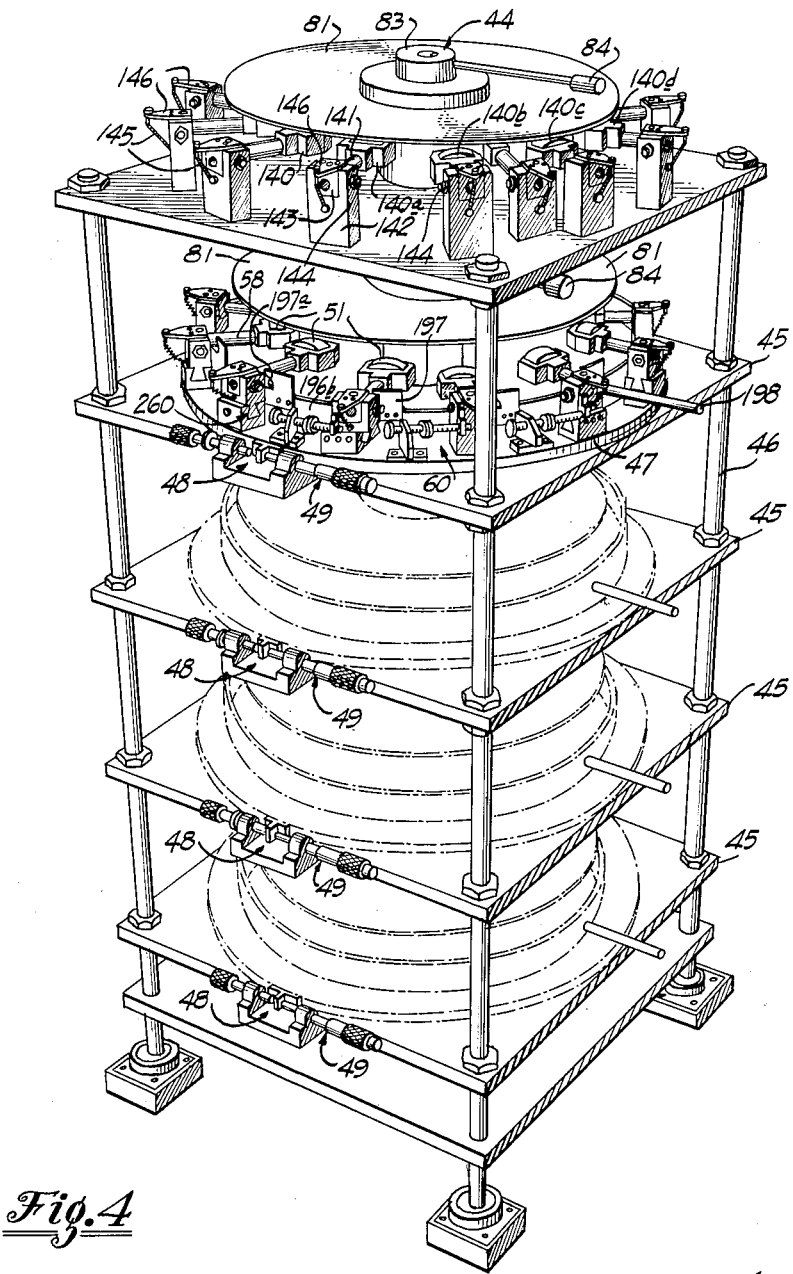
FIG. 4 is a perspective view showing the playback apparatus of the present invention.

Referring now to FIG. 3 for a description of the details of construction of the recording apparatus of the present invention, it will be observed that the physical construction of this device is somewhat similar to that of the reproducing apparatus shown in FIG. 4 and, accordingly, corresponding reference numerals have been assigned to similar elements. The recording apparatus illustrated in FIG. 3 comprises a vertical spindle or drive means indicated generally at 10, which is rotated by means of an appropriate drive not illustrated in FIG. 3, but shown schematically at 11 in FIG. 1. Actually, the drive mechanism for the spindle 10 is connected to the portion of the spindle 10 carried upon the lowermost deck of the recorder.

As previously indicated, the spindle 10 passes rotatively through a series of decks 45 which are non-rotatively supported upon a frame 46 in vertically spaced apart relationship. The magnetizable discs upon which the records are to be produced are individually mounted upon the spindle or common drive means 10 so that one of the records is located above each of the decks 45. Each of the decks 45 rotatively supports a carrier 47 in the form of a circular plate which may be rotated by means of an adjusting means 48. The latter means may be provided with a suitable indicator 49 in order to provide an indication of the position of the carrier 47 upon the deck 45. Each of the carriers 47 mounts a plurality of recording or transducer heads 9, there being one head for each of the geophones in the array 5 previously described.

Figure 6:
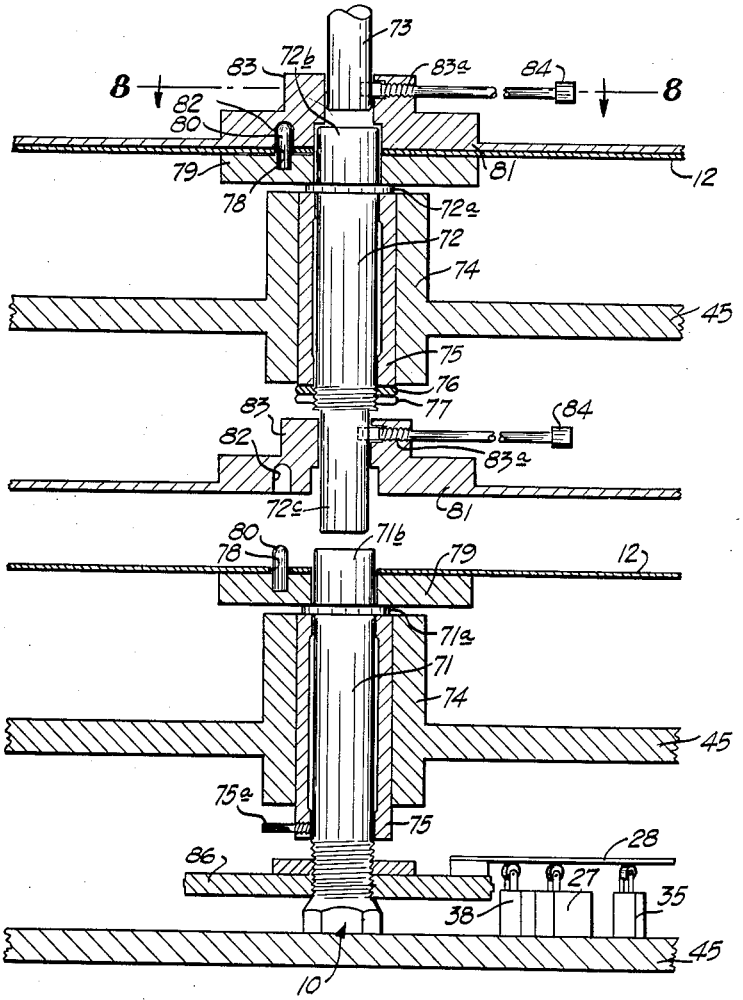
FIG. 6 is an enlarged fragmentary elevational view of the recording apparatus illustrated in FIG. 1 illustrating particularly the arrangement of elements to permit ready insertion of records into and removal of records from the device.
Figure 8:
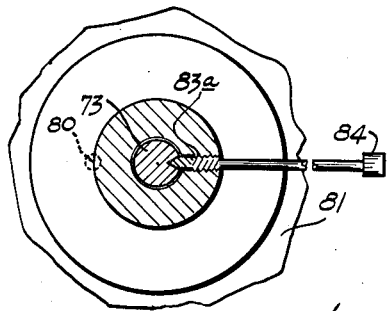
FIG. 8 is a sectional view taken along a line substantially corresponding to the line 8—8 in FIG. 6.

Referring now to FIGS. 6 and 8 for a description of the mechanism by which the records or discs may be inserted into or removed from the recording apparatus shown in FIG. 3, it will be observed that the spindle or drive means 10 actually comprises a plurality of spaced apart coaxial stub shafts 71, 72, 73, etc., which are respectively provided with positioning collars 71a, 72a, etc., formed integral therewith. Each of these stub shafts is adapted to be rotatably mounted within one of the decks 45. To this end, each of the decks includes a central hub portion 74 containing an appropriate bearing 75 which journals its associated stub shaft. To hold the stub shaft in position, the collar rests upon the upper end of the bearing 75, while the lower end of the bearing may be held in position by any suitable retaining means, as by the set screw 75a engaging shaft 71 or by means of a washer 76 and a retaining nut 77 threaded onto a portion of the shaft as shown on the shaft 72. In this manner, the stub shafts are held in fixed position but are rotatable with respect to the frame 46 with a small space being provided between the contiguous ends of the stub shafts to permit the insertion or removal of the record discs 12.

Each of the discs is supported upon an annular supporting plate 79 encircling the upper end portion 71b, 72b, etc., of each stub shaft and having its lower end resting upon the positioning collar of the stub shaft. In order to orient the disc 12 upon its supporting plate 79, the latter carries an indexing tab 80 which is adapted to be accommodated within a suitable hole 78 (FIG. 1) in the disc. When the disc 12 is properly positioned upon the plate 79, a backing plate 81 may be moved downwardly until it rests upon the upper face of the disc. In this position the indexing tab 80 fits within a corresponding opening 82 in a central hub portion 83 of the backing plate. This central hub portion is provided with an internally threaded opening 83a extending normal to the axis of the vertical spindle 10 for receiving a retaining screw 84 which may be employed to lock the backing plate 81 to the lower end portion of the adjacent stub shaft as, for example, the end portion 72c of the shaft 72. As illustrated in FIG. 8, the extreme inner end of the retaining screw 84 is shaped to fit within a correspondingly shaped indentation in its associated stub shaft in order to prevent the member 81 from slipping.

In view of the foregoing description, it will be recognized that in order to insert a disc into the recording apparatus of the present invention, the retaining screw 84 may be loosened and the backing plate 81 raised to break the driving connection between the adjacent stub shafts. The backing plate 81 may be locked in its raised position by tightening the retaining screw 84, at which time a disc may be inserted through the space between the stub shaft and into engagement with the supporting plate 79 in the manner described above. When the disc is properly assembled upon the supporting plate 79, the backing plate 81 is, of course, lowered by loosening the screw 84 and allowing the indexing tab 80 to fit within the opening 82. When the backing plate 81 reaches its fully lowered position, the screw 84 is again tightened to re-establish the drive connection between the stub shafts. The drive from the shaft 71 then passes through the plate 79, through the tab 80 to the backing plate 81, through the adjusting screw 84 to the stub shaft 72, and so on. Thus, in effect, the backing plate 81 and the associated plate 79 cooperate with the interconnecting tab and retaining screw 84 to provide a clutch or record supporting means through which drive passes from one stub shaft to the next. The members 79 and 81 forming the clutch may be separated, as described above, so that a disc may be inserted into or removed from the recording apparatus of the present invention without disassembling any of the stub shafts from its associated deck 45.

Figure 7:
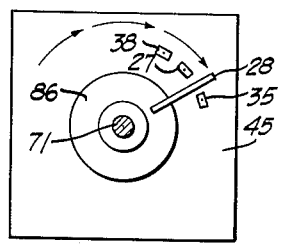
FIG. 7 is a reduced schematic view showing the control switches and their operating arm for controlling the energization of the recording apparatus of the present invention.

As will be apparent from FIGS. 6 and 7, the lowermost deck 45 may be employed to support the switches 27, 35 and 38 previously described. The operating arm 28 for these switches may be mounted upon a support plate 86, threadedly secured to the stub shaft 71, so that rotation of the shaft 71 actuates the switches 27, 35 and 38 in sequence in the manner described above to perform the aforementioned control functions. Thus, after the record discs 12 have been inserted, the recording apparatus operates to produce a plurality of reproducible seismic records in the manner previously described.

The seismic records produced may be inserted into the reproducing apparatus shown in FIG. 4 by employing a mechanism like that described above and, accordingly, a detailed description of this mechanism will not be repeated. It suffices to say that the vertical spindle 44, like the drive means 10, consists of a plurality of spaced apart shafts interconnected by a record supporting means like the members 79 and 81 previously described. In the apparatus illustrated in FIG. 4, only one bank of reproducing heads carried on one of the decks 45 has been illustrated in detail, in view of the fact that the lower banks are generally similar to the one shown.

As mentioned above, the signals appearing upon the records inserted into the reproducing apparatus are adapted to be reproduced by the magnetic heads 51 in such manner that signals reproduced from corresponding traces on the several records are composited by and fed through amplifiers 53 and 55 to the oscillographic recorder 53a which exhibits the composite signal for visual interpretation and analysis. In accordance with an important feature of the present invention, the composite signals appearing at the output of the amplifiers 53 and 55 may be recorded on a reproducible record driven in synchronism with the seismic records being reproduced. To this end, the uppermost deck 45 of the reproducing apparatus illustrated in FIGS. 2 and 4 supports composite signal recording apparatus in the form of a plurality of spaced apart magnetic recording heads 140, 140a, etc. Each of the heads 140 is carried upon an arm 141 which, in turn, is pivotally supported upon a bracket 142 fixedly secured to the uppermost deck. Thus, the bracket 142 includes a bifurcated upper portion which cradles a block 143 carried by the arm 141. A pair of pivot pins or trunnions 144 extend through the legs of the bifurcated portion of the bracket 142 and into engagement with the block 143 in order to provide a pivotal mounting for the arm 141 and the recording head. A spring 145 connected at one end to the bracket 142 and at its other end to an outwardly protruding element 146 carried on the block 143 normally urges the recording head into engagement with the record disc supported on the underside of the uppermost backing plate 81.

To record the composite signal appearing at the output of amplifier 53, the recording head 140 may be connected through conductors 148 and 149 to the output side of the amplifier as is illustrated in FIG. 2. Similarly, the output of amplifier 55 may be delivered to recording head 140a by conductors 151 and 152, and so on. The composite recording apparatus may also include a recording head 150 for recording an impulse corresponding to the shot point instants reproduced from the records after these shot point instants have been brought into coincidence by altering the adjusting means 48 as previously described until an appropriate indication appears on the cathode ray oscilloscope 57. If desired, a timing signal may also be recorded on the composite record by employing one of the recording heads of the composite recording bank. The recording head 150 is connected to the shot point pickup heads through conductors 153 and 154 and through a manually operated switch 155. The switch 155 is not closed until the shot point instants reproduced from the several records coincide, thus insuring that the recording head 150 is not energized prematurely.

Figure 5:
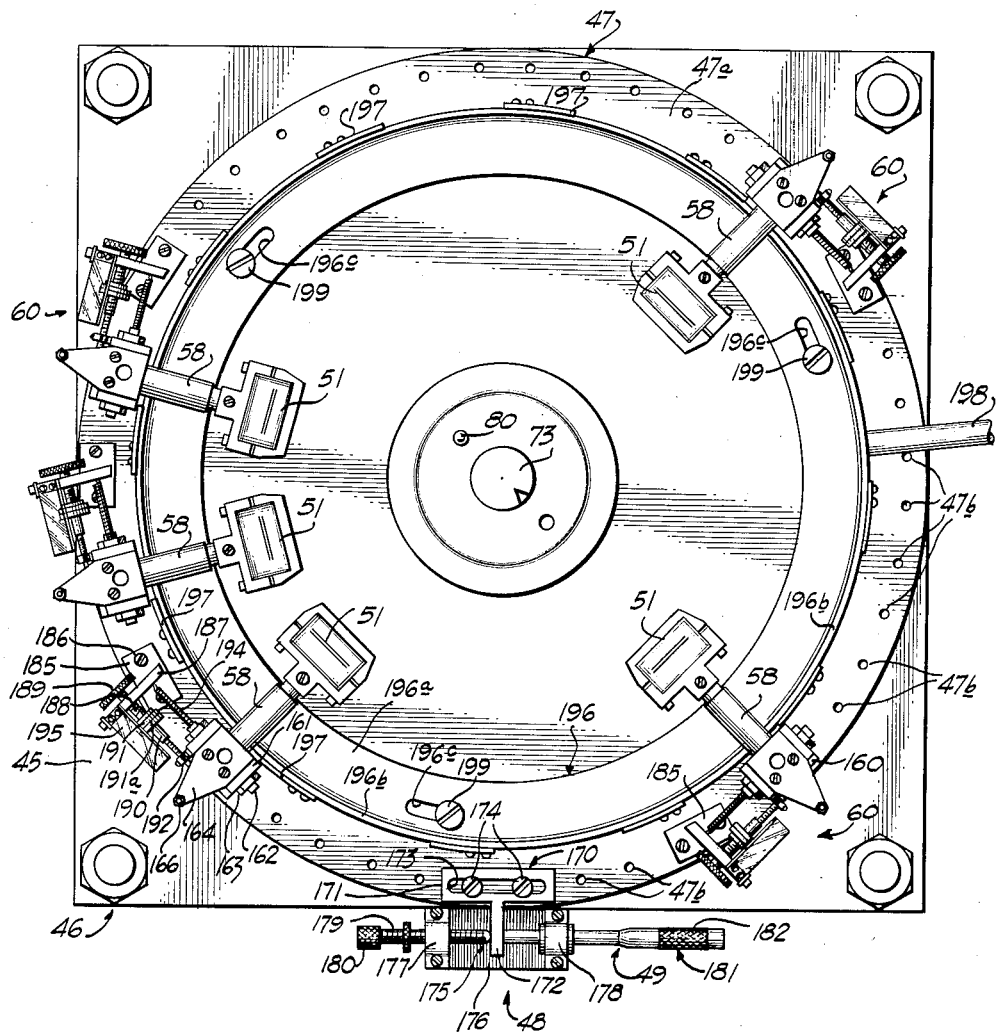
FIG. 5 is an enlarged plan view showing one of the banks of transducer heads of the present invention.

As previously indicated, the reproducing heads 51 associated with each record are mounted upon a common carrier plate 47 rotatably supported upon the frame 46. To this end, the plurality of spaced supports or brackets 160, best shown in FIGS. 5 and 6, are secured at predetermined positions on the rim 47a of the carrier 47. The rim 47a is provided with a series of equidistantly spaced tapped openings 47b for receiving attaching screws (not shown) by which the supports 160 may be secured to the carrier 47. By employing different pairs of the openings 47b, it is obvious that the supports may be attached at any desired position to the rim 47a, thus facilitating the disposition of the reproducing heads 51 in any desired relationship with respect to their associated record. As previously mentioned, the heads 51 are preferably oriented in positions respectively corresponding to the recording heads 9.

The record adjusting means 48 previously referred to for aligning the various records in corresponding time positions includes a member 170 having a base 171 and an outwardly extending projection 172. The base 171 is provided with an elongated slot 173 which is of sufficient length to encompass two adjacent openings 47b in the rim 47a. A pair of machine screws 174 passing through the slot 173 and into the two adjacent openings may be tightened to lock the member 170 on the carrier 47. By employing different pairs of the openings 47b, the position of the member 170 along the carrier may be altered, thus providing a "coarse" adjustment of the position of the carrier. A "fine" adjustment is then provided by means of a micrometer screw device 175. The latter device includes a mounting bracket 176 fixedly secured to the deck 45 and including a pair of spaced apart vertical bosses 177 and 178, one of which receives a lock screw 179 having a knurled head 180 and the other of which accommodates a micrometer 181 having an adjusting handle 182. To effect the fine adjustment, the lock screw 179 is loosened and the micrometer 181 is adjusted until the desired position of the carrier 47 is attained, i.e., until a record-to-record alignment is obtained when the shot point instants reproduced from all of the records coincide. The carrier may then be locked in position by turning screw 179 until its inner end engages the projection 172 and holds it firmly against the end of the micrometer 181. As previously indicated, a conventional scale 49 on the micrometer 181 indicates the position of the micrometer and facilitates the azimuth adjustment of the carrier 47.

As best shown in FIGS. 9 and 10, each of the supports 160 for the reproducing heads is provided with a longitudinally extending guide slot 160a having a key 160b secured therein in any suitable manner as by screws 160c. The slot 160a accommodates an integral extension 161a formed on a mounting member 161 which extension includes a guide channel 161b for receiving the key 160b. Instead of employing a separate key 160b and channel 161b, the sides of the guide slot may be tapered as indicated at 260 in FIG. 4 to receive a dove tail on the member 161. In any event, the member 161 is provided with a channel formed by a pair of spaced apart vertically extending walls 161d and 161c (FIG. 10). The latter walls have coaxial tapped bores therein for receiving trunnions 162 which extend through the walls and into the channel in order to pivotally mount a block 164 carried on reproducing head support arm 58. Lock nuts 163 threaded onto the trunnions 162 inhibit movement of the trunnions within their bores. The block 164 carries an outwardly extending arm 165 to which is secured an adjustable spring retaining screw 166. A spring 167 having one end secured to the screw 166 and the other end secured to an attaching screw 168 on the member 161 normally urges the arm to pivot in a clockwise direction as viewed in FIG. 10 so that the transducer head is urged into engagement with the under side of the record. The tension on the spring 167 may be altered by adjusting the screw 166, thereby to control the engaging force between each of the reproducing heads and the record.

As previously indicated, the azimuth position of each of the reproducing heads 51 may be adjusted by the means 60 in order to compensate or correct for trace-to-trace time displacement. To this end, the adjusting means 60 is adapted to effect sliding movement of the member 161 in the support 160. The adjusting mechanism 60 includes a base 185 secured to the carrier 47 in fixed position by means of a pair of screws 186 engaging adjacent openings 47b in the rim 47a. An upstanding leg 187 on the base 185 is provided with an internally threaded central opening for accommodating an adjustable lead screw 188 having a knurled head 189 by which it may be manually turned. The screw passes through a cylindrical sleeve 190 having an indicator collar 191 formed thereon and then passes into engagement with a threaded opening in an element 192 attached to the member 161. The element 192 is bifurcated as is best shown in FIG. 10 and includes a locking screw 193 which when tightened draws the bifurcated portions of the element 192 together and prevents rotation of the lead screw 188. A spring 194 secured at one end to the leg 187 and at the other end to the member 161 normally urges the latter member toward the left as viewed in FIG. 9 and, hence, provides a force opposing adjustment of the member 161 towards the right by the lead screw 188. Obviously, when the screw 193 is loosened, the lead screw may be adjusted to move the member 161 either to the left or to the right as viewed in FIG. 9, thus adjusting the azimuth position of the reproducing head and effecting the trace-to-trace time correction previously described. After the adjustment is completed, the member 161 may be locked in position by tightening the locking screw 193.

To provide an indication of the adjusting position of each reproducing head with respect to the carrier 47, the leg 187 may carry an indicating scale 195 provided with graduations overlying the collar 191. The latter collar rotates with the screw 188 and moves to the right or left with the member 161. An indexing mark 191a on the collar cooperates with the indicating scale 195 to identify the position of the member 161 and, hence, the azimuth location of the reproducing head.

In view of the foregoing description, it will be recognized that each of the reproducing heads is normally urged upwardly and into engagement with one of the traces recorded on the underside of the record. A record-to-record alignment is effected by altering the adjusting means 48 until the shot point instants reproduced from the records coincide as indicated by the image appearing on the screen of the oscilloscope 57. In this manner, time displacements existing between the records are compensated for or are corrected. Trace-to-trace time displacements of the character described above are compensated for by the adjusting means 60 so that the desired reflected wave energies in the composite signals are accentuated while undesired reflections and spurious noises are attenuated by their mutual cancellations.

Frequently the apparatus described above must be transported from place to place for use in conducting seismic surveys and during such transport it is desirable that the transducing heads of the recording apparatus and the reproducing apparatus be held out of engagement with their associated records and the other elements of the equipment such as the backing plates 81. To this end, each of the carriers 47, as best shown in FIG. 5, has a camming plate 196 rotatably mounted thereon. This plate has an annular base 196a and an upstanding rim 196b having a plurality of spaced apart cam members 197 mounted in fixed position thereon, there being one such member for each of the transducer heads. Each of the members 197 includes an open ended slot 197a best shown in FIG. 4 having an appropriately shaped upper camming surface adapted to engage the arm 58 when the camming plate 196 is rotated.

To facilitate manual rotation of the camming plate, the latter is provided with an outwardly extending operating lever 198. The annular base 196a of the camming plate includes a plurality of spaced apart, elongated slots 196c therein each of which accommodates a locking screw 199 secured within a tapped opening in the carrier 47. When the screws 199 are all loosened, the operating lever 198 may be employed to turn the camming plate 196 in a clockwise direction as viewed in FIG. 5 so that the camming surface of the slot 197a in each of the members 197 engages its associated arm 58 and forces the latter to pivot in a counterclockwise direction as viewed in FIG. 10 against the action of spring 167, thereby moving the transducer heads out of engagement with their associated record in unison. The screws 199 may then be tightened to hold the transducer heads in disengaged position. The above procedure may be repeated for each of the carriers 47 by rotating its associated camming plate, until all of the transducer heads are moved to disengaged position. The equipment may then be shipped without the likelihood of damage to the heads resulting from contact of the heads with other parts of the apparatus. When the equipment is to be used again, the screws 199 are loosened and the camming plate is rotated in a counterclockwise direction as viewed in FIG. 5, in order to release the transducer heads and permit the springs 167 to urge them against their record.

The transducer or recording heads 9 of the recording apparatus illustrated in FIG. 3 are mounted upon structure generally similar to that employed for the reproducing apparatus described above except that the recording head mountings need not be adjustable. Of course, an adjustable mounting could be employed if desired, as illustrated by the bank of recording heads on the uppermost deck. However, as illustrated by the recording heads on the uppermost deck. However, as illustrated by the recording heads on the remaining decks, the mounting means may comprise merely a fixed bracket 200 secured to the carrier 47 and a pivotal mounting block 201 having a dove tail 201a thereon fitting within an appropriately shaped channel in the bracket. A screw 202 may be employed to lock the dove tail 201a within the channel in order to prevent movement of the mounting block 201 with respect to the bracket 200. The recording apparatus, as indicated above, includes a camming plate associated with each deck for disengaging the recording heads 9 from the records and from the backing plate 81 during transport of the apparatus.

While a particular embodiment of the invention has been shown and described, it will be understood that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. In a transducing apparatus for use in seismic surveying systems employing a plurality of reproducible disc-type records, the combination of a frame, a stack of spaced apart plates on said frame, a driven shaft, a plurality of aligned shafts each supported by one of said plates and disposed coaxially with said driven shaft, all of the shafts having an end portion spaced from the end portion of an adjacent shaft, and structure interconnecting the end portions of adjacent shafts to complete a drive connection therebetween, said structure including separable members one of which is secured to one of said shafts, means detachably securing the other of said separable members to the end portion of a shaft adjacent said one shaft so that, when detached, said other member can be moved axially of said adjacent shaft to permit insertion of a record through the space between the end portion of said one shaft and the end portion of said adjacent shaft, and an element spaced from said shafts for interconnecting said separable members to complete a drive connection therebetween.

2. In a transducing apparatus for use in seismic surveying systems employing a plurality of reproducible disc-type records, the combination of a frame, a stack of vertically spaced apart plates on said frame, a driven shaft, a plurality of aligned shafts each supported by one of said plates and disposed coaxially with said driven shaft, all of the shafts having an end portion spaced from the end portion of an adjacent shaft, rotatable record supporting means interconnecting the end portions of adjacent shafts to complete a drive connection therebetween, each of said record supporting means including separable members one of which is secured to one of said shafts and the other of which may be moved axially of an adjacent shaft to permit insertion of a record through the space between the end portion of said one shaft and the end portion of said adjacent shaft and onto said record supporting means, a connecting element spaced from said shafts extending between said members to complete a drive connection between said one member and said other member, and means for detachably securing said other member to said adjacent shaft in order to complete a drive connection to said adjacent shaft and, hence, to permit said adjacent shaft to be driven from said one shaft.

3. In a transducing apparatus for use in seismic surveying systems employing a plurality of reproducible disc-type records, the combination of a frame, a stack of spaced apart plates on said frame, a driven shaft, a plurality of aligned shafts each supported by one of said plates and disposed coaxially with said driven shaft with the end portions of the shaft being spaced from the end portion of an adjacent shaft, and rotatable record supporting means interconnecting the end portions of adjacent shafts, said record supporting means having separable portions one of which is secured to and rotatable with the end portion of one shaft and the other of which is detachably connected to the end portion of the adjacent shaft so that said other portion, when detached, may be moved axially along its shaft to permit insertion of a record through the space between the end portions of the adjacent shafts and a connecting element spaced from said shafts and extending between said separable portions to complete a drive connection therebetween.

4. In a transducing apparatus for use in seismic surveying systems employing a plurality of reproducible disc-type records, the combination of a frame, a stack of vertically spaced apart plates on said frame, a driven shaft, a plurality of aligned shafts each supported by one of said plates and disposed coaxially with said driven shaft, all of the shafts having an end portion spaced from the end portion of an adjacent shaft, and rotatable record supporting means interconnecting the end portions of adjacent shafts, said record supporting means including a pair of separable members one of which is secured to an end portion of one of said shafts and the other of which is detachably secured to the adjacent end portion of the adjacent shaft, so that said other member may be moved axially of its shaft to permit insertion of a record through the space between the end portions of the adjacent shafts, means for detachably securing said other member to said adjacent shaft, one of said separable members including an element spaced from said shafts for indexing the record carried by said record supporting means and engageable with the other separable member to transfer drive between the separable members and, hence, to complete a drive connection between the end portions of the adjacent shafts.

5. In a transducing apparatus for use in seismic surveying systems employing a plurality of traces on a magnetic disc-type record, the combination of a frame, means including structure carried on said frame for rotating the record, a plurality of spaced apart magnetic heads, one for each of said traces, supported on said frame and adapted to engage the record, and a camming plate rotatable with respect to said magnetic heads and said frame about the axis of said record for simultaneously engaging the heads and holding them out of engagement with said record and said rotating means during transport of said apparatus.

6. In a transducing apparatus for use in seismic surveying systems employing a plurality of traces on a magnetic disc-type record, the combination of a frame, means including structure carried by said frame for rotating the record, a plurality of spaced apart magnetic heads, one for each of said traces, adapted to engage the record, a common support plate for said heads rotatably mounted upon said frame, and structure mounted for rotation about the axis of said record and rotatable relative to said support plate for simultaneously engaging the heads and holding them out of engagement with said record and said rotating means during transport of said apparatus.

7. In a transducing apparatus for use in seismic surveying systems employing a plurality of traces on a magnetic disc-type record, the combination of a frame, means for rotating the record, a plurality of spaced apart magnetic heads, one for each of said traces, adapted to engage the record, a common support plate for said heads rotatably mounted on said frame, support means for each of said heads secured to said plate, structure pivotally mounting each head upon its support means, biasing means normally urging each head to pivot about its support means and into engagement with the record, and a camming plate rotatable with respect to said support plate about the axis of said record for simultaneously engaging the heads and pivoting them about their support means against the action of said biasing means so that they are maintained out of engagement with said record and said rotating means during transport of said apparatus.

References Cited in the file of this patent

UNITED STATES PATENTS

| | | |
|---|---|---|
| 897,765 | Morin | Sept. 1, 1908 |
| 951,158 | Vogt | Mar. 8, 1910 |
| 1,262,521 | Knights | Apr. 9, 1918 |
| 1,291,027 | Krauss | Jan. 14, 1919 |
| 1,841,377 | Oranges | Jan. 19, 1932 |
| 2,394,990 | Eisler | Feb. 19, 1946 |
| 2,436,971 | Moore | Mar. 2, 1948 |
| 2,551,845 | Lindsay | May 8, 1951 |
| 2,604,262 | Phelps | July 22, 1952 |
| 2,683,254 | Anderson | July 6, 1954 |
| 2,795,287 | Sharpe | June 11, 1957 |
| 2,806,757 | Cunningham | Sept. 17, 1957 |
| 2,837,729 | Houghton | June 3, 1958 |
| 2,889,000 | Silverman | June 2, 1959 |